United States Patent
Baldassa (10) Patent No.: US 7,092,802 B2
(45) Date of Patent: Aug. 15, 2006

(54) VEHICLE WEBSITE AUDIO/VIDEO COMMUNICATION LINK

(75) Inventor: John A. Baldassa, West Bloomfield, MI (US)

(73) Assignee: General Motors Corporation, Detroit, MI (US)

(*) Notice: Subject to any disclaimer, the term of this patent is extended or adjusted under 35 U.S.C. 154(b) by 8 days.

(21) Appl. No.: 10/808,977

(22) Filed: Mar. 25, 2004

(65) Prior Publication Data

US 2005/0216144 A1    Sep. 29, 2005

(51) Int. Cl.
*G01C 21/00* (2006.01)
*G08C 19/12* (2006.01)

(52) U.S. Cl. .................. 701/24; 701/201; 348/552

(58) Field of Classification Search .............. 701/24, 701/200, 201; 455/553.1, 556.1, 556.2, 557, 455/457; 348/211.99, 552, 208.99, 208.14; 307/10.1, 10.2, 9.1; 340/531, 539.11, 425.5, 340/539.1, 426.1

See application file for complete search history.

(56) References Cited

U.S. PATENT DOCUMENTS

| | | | |
|---|---|---|---|
| 4,674,454 A | 6/1987 | Phairr | |
| 5,732,074 A * | 3/1998 | Spaur et al. | 370/313 |
| 6,335,753 B1 | 1/2002 | McDonald | |
| 6,389,339 B1 | 5/2002 | Just | |
| 6,429,773 B1 * | 8/2002 | Schuyler | 340/425.5 |
| 6,434,478 B1 * | 8/2002 | Ikeda | 701/200 |
| 6,493,020 B1 | 12/2002 | Stevenson et al. | |
| 6,526,335 B1 | 2/2003 | Treyz et al. | |
| 6,545,698 B1 | 4/2003 | Hong | |
| 6,771,167 B1 * | 8/2004 | Flick | 307/10.2 |
| 6,862,460 B1 * | 3/2005 | Safadi | 455/553.1 |
| 6,873,261 B1 * | 3/2005 | Anthony et al. | 340/574 |
| 2002/0133273 A1 | 9/2002 | Lowrey et al. | |
| 2003/0041329 A1 * | 2/2003 | Bassett | 725/105 |
| 2003/0053536 A1 * | 3/2003 | Ebrami | 375/240.01 |
| 2004/0155808 A1 * | 8/2004 | Kahn | 341/176 |

* cited by examiner

*Primary Examiner*—Dalena Tran
(74) *Attorney, Agent, or Firm*—Laura C. Hargitt (57) ABSTRACT

A website interface system for a vehicle includes a vehicle with a first camera. A remote device includes a first display and a first microphone. A vehicle website provider communicates with, and establishes a communications interface between, the vehicle and the remote device. The remote device controls a position of the first camera and the first display displays an image from the first camera. A user of the remote device uses the first microphone to communicate with an occupant of the vehicle. The vehicle includes a second microphone that the occupant uses to communicate with the user. The vehicle includes a second display and the remote device includes a second camera. The second display displays an image from the second camera. The remote device controls a loudspeaker that is located on an exterior of the vehicle. The vehicle includes a controller that stores an image from the first camera.

38 Claims, 5 Drawing Sheets

VEHICLE WEBSITE AUDIO/VIDEO COMMUNICATION LINK

FIELD OF THE INVENTION

The present invention relates to vehicle communications systems, and more particularly to vehicle audio/video communications systems that have remote access.

BACKGROUND OF THE INVENTION

Wireless communications services for vehicles are becoming increasingly popular. Service providers conventionally offer services that include mobile phone service, e-mail access, real-time driving directions, and remote door access. For example, a driver may accidentally lock a key inside of a vehicle. Some vehicle manufacturers provide an anti-lockout system that disables door locks when a key is left in an ignition of the vehicle and a driver's side door is open. However, the anti-lockout system provides no assistance when the key is left inside of the vehicle but not in the ignition.

A driver may call for roadside assistance to have the doors unlocked by a mechanic. However, the driver may have to wait a long time for roadside assistance to arrive and the service may be costly and/or risk damage to the vehicle. In one approach, a wireless communications service provider remotely unlocks the vehicle. This service typically requires the driver to have access to a telephone and also to speak to a service representative.

Some vehicle manufacturers also provide remote starting systems that allow a driver to start an engine of the vehicle while the driver is located outside of the vehicle. The driver typically starts the engine by pressing a button on a key fob that has a built-in transmitter. However, the transmitter has a limited range and the driver must be within a specified range of the vehicle for the remote starting system to work. For example, the driver may not be able to operate the remote starting system from within a building.

Even if the driver is within the specified range of the vehicle, the driver may have no indication that the remote starting system works unless the driver has visual contact with the vehicle. In one approach, vehicle manufacturers provide key fobs with increased range and and/or engine status feedback. However, these systems are very expensive.

Drivers also commonly leave vehicles unattended for extended periods of time. For example, a driver may leave a vehicle at home or in long-term parking at an airport or another location while the driver is on vacation. The driver either leaves the vehicle completely unattended or relies on other people such as employees of a parking lot to make sure that the vehicle is secure. During this time, vehicles are particularly susceptible to theft and/or damage.

In one approach for reducing theft, a wireless communications service provider locates a missing vehicle when the vehicle includes a global positioning system. However, a wireless communications service provider must typically be informed that a vehicle is missing before it attempts to locate the vehicle and it cannot detect when the vehicle is damaged.

SUMMARY OF THE INVENTION

A website interface system for a vehicle according to the present invention includes a vehicle with a first camera. A remote device includes a first display and a first microphone. A vehicle website provider communicates with the vehicle and the remote device and establishes a communications interface between the vehicle and the remote device. The remote device controls a position of the first camera through the communications interface and the first display displays an image from the first camera. A user of the remote device uses the first microphone to communicate with an occupant of the vehicle.

In other features, the remote device controls an engine of the vehicle through the communications interface. The remote device one of activates and deactivates the engine. The remote device controls a door of the vehicle through the communications interface. The remote devices one of locks and unlocks the door. The vehicle includes a second microphone and the occupant uses the second microphone to communicate with the user. The vehicle includes a second display and the remote device includes a second camera. The second display displays an image from the second camera. The second display is only activated when an engine of the vehicle is deactivated.

In still other features of the invention, the remote device controls a loudspeaker that is located on an exterior of the vehicle through the communications interface. The user uses the first microphone to communicate with entities that are located exterior to the vehicle through the loudspeaker. The vehicle includes a second microphone that is located on the exterior and wherein the user and the entities use the first and second microphones, respectively, to communicate.

In yet other features, the vehicle includes a controller that stores an image from the first camera. The controller automatically captures at least one image from the first camera when the vehicle is impacted. A position of the first camera automatically adjusts as the controller automatically captures at least two images from the first camera. The vehicle website provider includes a data storage device and the user uploads the image to the data storage device.

In still other features of the invention, the vehicle website provider receives vehicle parameters from the vehicle and displays the vehicle parameters on the first display. The vehicle website provider receives global positioning information from the vehicle and displays a location of the vehicle on the first display. The remote device communicates with the vehicle website provider through one of a private connection and an Internet protocol address. The remote device is one of a personal computer, a mobile telephone, and a personal digital assistant device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For purposes of clarity, the same reference numbers will be used in the drawings to identify similar elements.

Figure 1:
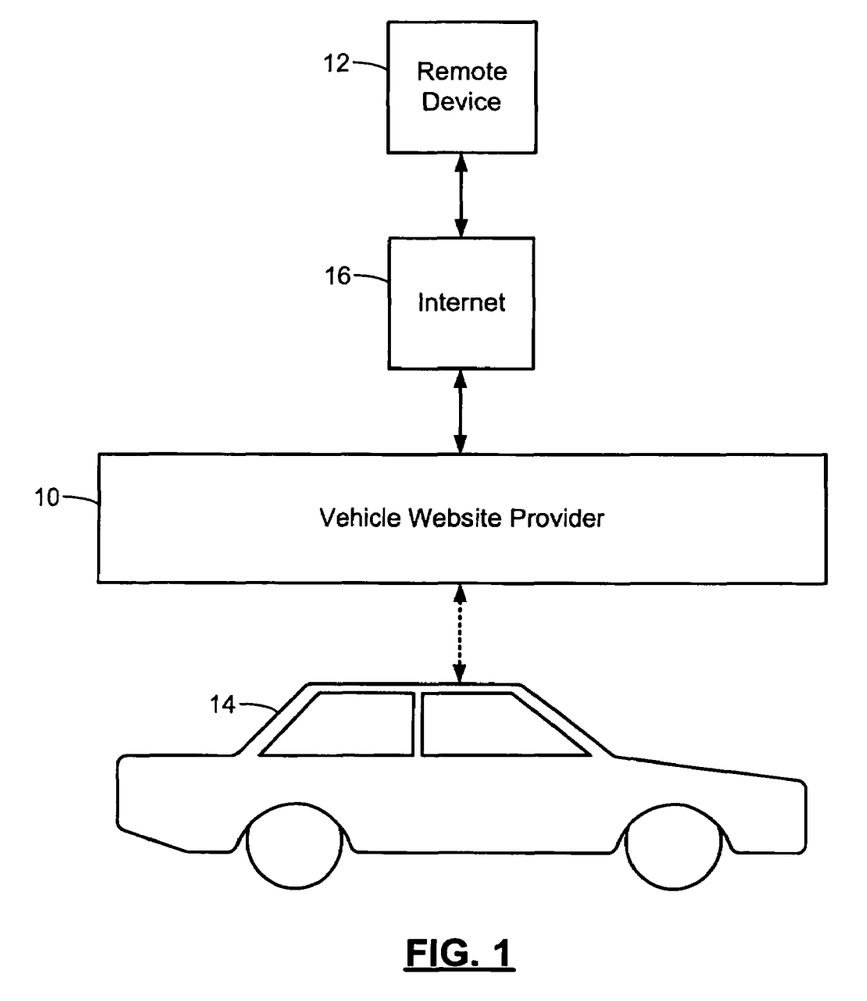
FIG. 1 is a functional block diagram of a vehicle website provider that communicates with a remote device and a vehicle according to the present invention.

Referring to FIG. 1, a vehicle website provider 10 establishes a communications interface between a remote device 12 and a vehicle 14. The communications interface allows the remote device 12 to control a device and/or a feature of the vehicle 14. For example, the remote device 12 may be one of a personal computer, a personal digital assistant, and a mobile phone.

In an exemplary embodiment, the remote device 12 communicates with the vehicle website provider 10 through a distributed communications system 16 such as the Internet. For example, the remote device 12 may access a vehicle website that is run by the vehicle website provider 10 through a uniform resource locator (URL) that corresponds with an Internet protocol (IP) address on the Internet. However, the remote device 12 may also communicate with the vehicle website provider 10 through a direct connection such as a dial-up telephone connection or a wireless satellite connection to a dedicated server that is not publicly accessible on the Internet. The vehicle 14 wirelessly communicates with the vehicle website provider 10. For example, the vehicle 14 may communicate with the vehicle website provider 10 through a terrestrial and/or a satellite connection.

Figure 2:
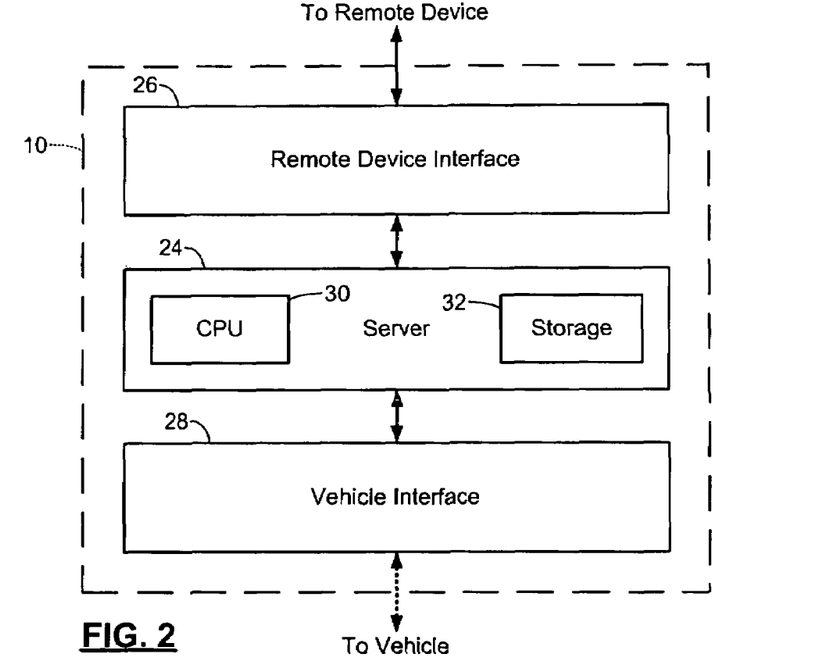
FIG. 2 is a functional block diagram of the vehicle website provider of FIG. 1.

Referring now to FIG. 2, the vehicle website provider 10 is illustrated in further detail. The remote device 12 communicates with a server 24 in the vehicle website provider 10 through a remote device interface 26. The vehicle 14 communicates with the server 24 through a vehicle interface 28. The server 24 includes a central processing unit (CPU) 30 that includes a processor and associated memory such as random access memory (RAM). The server 24 also includes a storage device 32 such as a hard disk drive or another data storage device. The storage device 32 stores data such as a user interface for the vehicle website provider 10 and client data. For example, in an exemplary embodiment the user interface is a graphical user interface such as an Internet website. The client data may include account information for clients and sign-on information such as usernames and passwords.

The CPU 30 processes data from the remote device 12, the vehicle 14, and the storage device 32. A remote user of the remote device 12 controls devices and/or features of the vehicle 14 by accessing vehicle webpage of the vehicle website provider 10 that is stored in the storage device 32. The vehicle 14 may also store data in the storage device 32 such as vehicle performance or vehicle status data that is accessible by the remote device 12.

Figure 3:
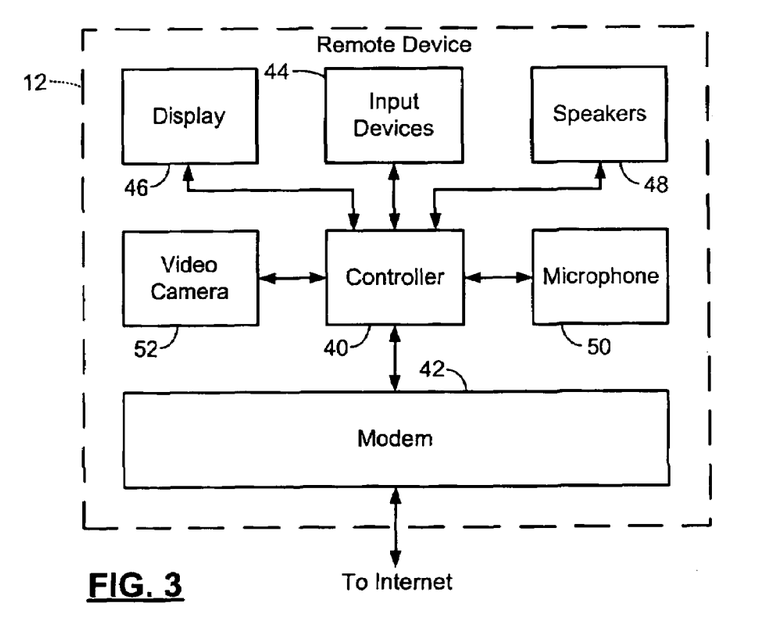
FIG. 3 is a functional block diagram of the remote device of FIG. 1.

Referring now to FIG. 3, the remote device 12 is illustrated in further detail. The remote device 12 includes a remote controller 40 that communicates with a modem 42. The remote controller 40 may be an independent controller that includes a processor, associated memory, and a data storage device, or the remote controller 40 may be part of another computer or electronic device. The modem 42 communicates with the vehicle website provider 10 through the Internet or a private direct connection. The modem 42 may be dial-up modem, a digital subscriber line (DSL) modem, or a cable modem in a wired Internet connection. The modem 42 may also be a wireless communications device that wirelessly connects to the Internet. For example, if the remote device 12 is a mobile phone or a personal digital assistant (PDA), the modem 42 may connect to the vehicle website provider 10 through a wireless web connection of a wireless service provider.

The remote controller 40 processes data from the modem 42 and devices in the remote device 12. The remote user initiates commands with one or more input devices, identified at 44. The input devices 44 may include a keyboard, a mouse, a touch-screen, and/or one or more buttons or other input devices. The remote device 12 also includes a remote display 46 such as a computer monitor that allows the remote user to interact with and initiate commands on the vehicle website. The remote device 12 includes remote speakers 48 that allow the remote user to listen to an interior and/or an exterior of the vehicle 14.

A remote microphone 50 allows the remote user to verbally communicate with an interior and/or exterior of the vehicle 14. For example, the remote user may use the remote speakers 48 and remote microphone 50 to communicate with an occupant of the vehicle 14. A remote camera 52 allows the remote user to visually communicate with the vehicle 14. For example, the remote camera 52 may allow an occupant of the vehicle 14 to view the remote user.

Figure 4:
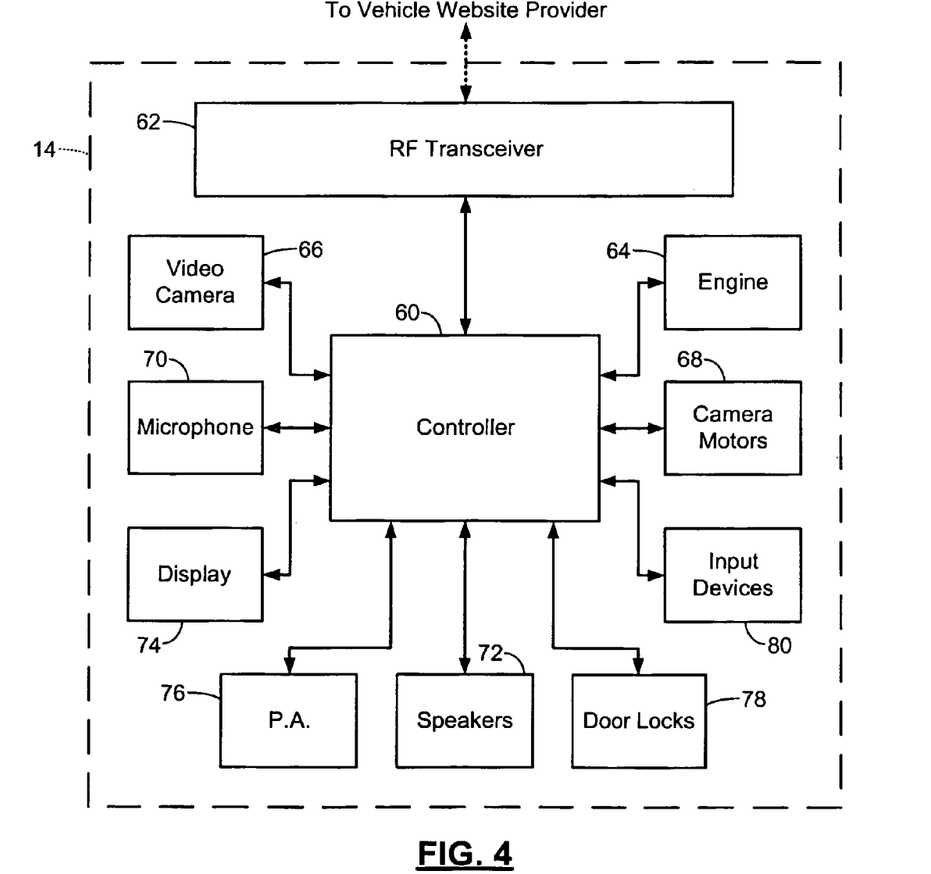
FIG. 4 is a functional block diagram of a vehicle communications system in the vehicle of FIG. 1.

Referring now to FIG. 4, the vehicle 14 includes a vehicle controller 60 that communicates with a radio frequency (RF) transceiver 62. The RF transceiver 62 wirelessly communicates with the vehicle website provider 10 through a terrestrial and/or a satellite connection. The vehicle controller 60 may be an independent controller that includes a processor, associated memory, and a data storage device, or the vehicle controller 60 may be part of a vehicle computer. The vehicle controller 60 processes data from the RF transceiver 62 and devices in the vehicle 14. The vehicle controller 60 communicates with an engine 64 of the vehicle 14. This allows the user of the remote device 12 to initiate a command that activates or deactivates the engine 64.

A vehicle camera 66 that communicates with the vehicle controller 60 allows the remote user to view the interior and/or exterior of the vehicle 14. The remote user controls a position of the vehicle camera 66 by initiating a command that adjusts one or more camera motors 68. For example, the remote user may adjust a position of the vehicle camera 66 to view an occupant of the vehicle 14. The vehicle 14 includes a vehicle microphone 70 that allows the vehicle occupant to verbally communicate with the remote user.

Vehicle speakers 72 allow the vehicle occupant to hear the remote user. When the vehicle 14 includes a vehicle display 74, the vehicle occupant may view images from the remote camera 52. For example, the remote user and the vehicle occupant may establish a video conference connection that utilizes cameras, speakers, and microphones in the vehicle 14 and the remote device 12.

A public address device 76 includes a microphone and/or a loudspeaker that is located on an exterior of the vehicle 14. The public address device 76 allows the remote user to communicate with entities outside of the vehicle 14. The vehicle controller 60 communicates with one or more door locks 78 of the vehicle 14. This allows the remote user to lock or unlock doors of the vehicle 14. The vehicle occupant operates uses one or more input devices 80 to control devices in the vehicle 14. The input devices 80 may include one or more buttons on a console and/or a touch-screen.

During operation, the remote device 12 initiates a command and the remote controller 40 transmits a command signal to the modem 42. For example, the command signal may be one or more data packets with a destination address. The modem 42 transmits the command signal to the remote device interface 26 in the vehicle website provider 10. The remote device interface 26 transmits the command signal to the CPU 30 in the server 24. The CPU 30 reads the command signal and determines whether the command is intended for the server 24 or a device in the vehicle 14. If the command is intended for the server 24, the CPU 30 processes the command signal. If the command is intended for a device in the vehicle 14, the CPU 30 forwards the command signal to the vehicle interface 28.

The vehicle interface 28 transmits the command signal to the vehicle controller 60. The vehicle controller 60 reads the command signal and controls a device in the vehicle 14 according to the command. The vehicle 14 similarly transmits communications signals from devices in the vehicle 14 to the server 24 and/or the remote controller 40 through the RF transceiver 62 and the vehicle website provider 10.

Figure 5:
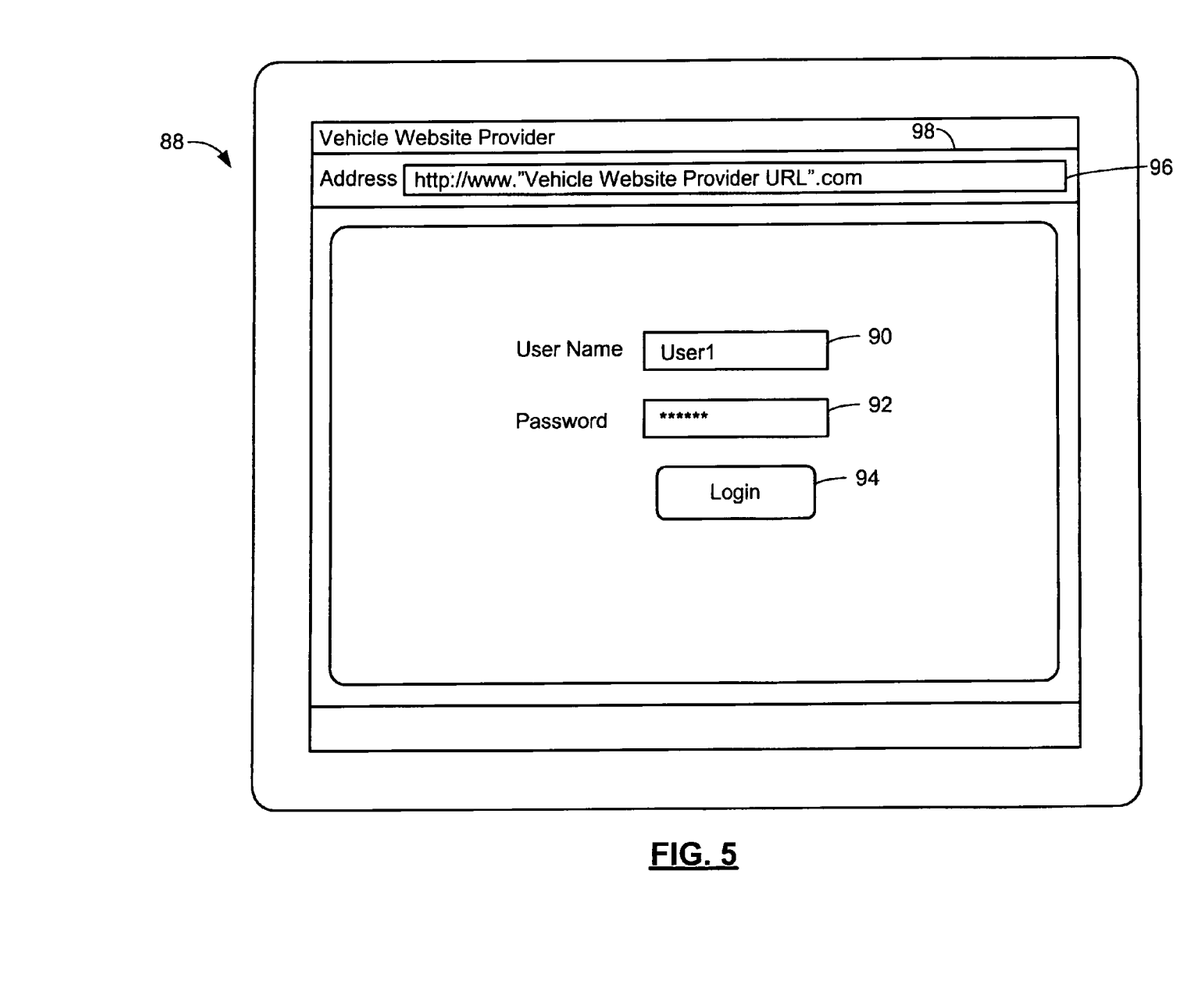
FIG. 5 illustrates an exemplary login screen for a vehicle website according to the present invention.

Referring now to FIG. 5, an exemplary sign-on page 88 for the vehicle website according to the present invention includes a username field 90, a password field 92, and a login button 94. The remote user enters a URL or an IP address of the vehicle website into an address field 96. For example, the address field 96 may be part of an address bar 98 for an Internet web browser. The remote user has an account with the vehicle website provider 10 and is assigned a unique username and password. The remote user enters a username in the username field 90 and an associated password in the password field 92. The remote user then activates the login button 94 to log into the vehicle website. For example, the remote user may click the login button 94 with a mouse or touch the login button 94 on a touch-screen.

Figure 6:
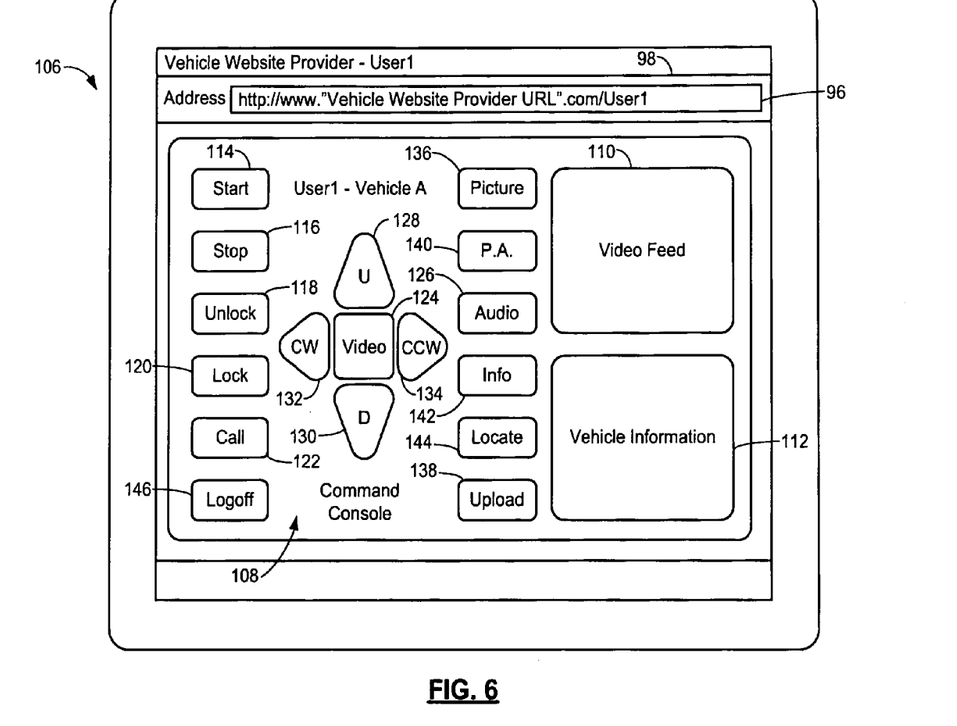
FIG. 6 illustrates an exemplary command console screen for the vehicle website.

Referring now to FIG. 6, when the remote user successfully logs into the vehicle website, the remote user is directed to a command page 106. The command page 106 in FIG. 6 is exemplary and includes a remote command console 108, a video feed window 110, and a vehicle information window 112. The command page 106 preferably identifies the remote user and the vehicle 14 in the event that the remote user has access to more than one vehicle.

The remote command console 108 includes engine start and engine stop buttons 114 and 116, respectively. The engine start and engine stop buttons 114 and 116, respectively, allow the remote user to activate or deactivate the engine 64. A remote engine starting system for a vehicle is described in U.S. Pat. No. 4,674,454. The remote user may wish to activate the engine 64 of the vehicle 14 from within a building on a cold day. For example, the remote user may not possess a key fob with a transmitter that allows the remote user to remotely start the engine 64. Additionally, the remote user may not be within a specified range of a key fob while the remote user is inside of a building.

The remote user activates the engine 64 of the vehicle 14 by activating the engine start button 114. The remote user deactivates the engine 64 by activating the engine stop button 116. The vehicle information window 112 preferably displays a current status of the engine 64 to allow the remote user to confirm the status of a command.

Door unlock and door lock buttons 118 and 120, respectively, allow the remote user to unlock or lock one or more door locks 78 of the vehicle 14. For example, the remote user may unlock the doors of the vehicle 14 when a driver of the vehicle 14 accidentally locks keys to the vehicle 14 inside of the vehicle 14. The remote user unlocks the vehicle doors by activating the unlock button 118 and locks the vehicle doors by activating the lock button 120. As with the engine start and stop buttons 114 and 116, respectively, the vehicle information window 112 preferably displays a current status of the door locks 78.

A call button 122 allows the remote user to initiate communications with the vehicle 14. For example, the call button 122 may automatically activate the vehicle camera 66 and/or the vehicle microphone 70. The remote user calls the vehicle 14 by activating the call button 122. Buttons on the remote command console 108 preferably appear as highlighted or as a different color when respective features of the buttons are activated. For example, when the call button 122 is activated, a video button 124 and/or an audio button 126 may change color or become highlighted to show that these features are activated.

The video button 124 allows the remote user to selectively activate or deactivate a video feed from the vehicle camera 66. The vehicle camera 66 may be mounted in any location inside or outside of the vehicle 14, and the vehicle 14 may also include additional cameras for different vantage points. For example, in an exemplary embodiment, the vehicle camera 66 is mounted on a rearview mirror of the vehicle 14 for an optimal 360 degree view of the interior and exterior of the vehicle 14. Images from the vehicle camera 66 appear in the video feed window 110. The remote user selectively displays the video feed by activating the video button 124.

The remote user adjusts a position of the vehicle camera 66 by activating one of an upward tilt button 128, a downward tilt button 130, a clockwise rotate button 132, and a counterclockwise rotate button 134. The remote user may adjust a position of the vehicle camera 66 to view occupants or objects inside of the vehicle 14 as well as entities outside of the vehicle 14. For example, a remote user may wish to view a location that a driver of the vehicle 14 is traveling to such as a vacation destination or a landmark site. A remote user may also wish to verify a condition of the vehicle 14 while an owner of the vehicle 14 is out of town or far away from the vehicle 14. Additionally, a remote user may wish to visually communicate with a driver or occupant of the vehicle 14.

The audio button 126 allows the remote user to selectively activate or deactivate an audio feed from inside of the vehicle 14. For example, a remote user may wish to view the inside of the vehicle 14 without listening to noises or conversation inside of the vehicle 14. The remote user toggles the audio stream by activating the audio button 126.

A remote user may also wish to capture an image from the vehicle camera 66. A picture button 136 allows the remote user to activate a digital camera feature of the vehicle camera 66. After the remote user adjusts the position of the vehicle camera 66 to focus on a desired target, the remote user activates the picture button 136 to capture a digital image from the vehicle camera 66. The captured digital image may be previewed in the video feed window 110 or another window. The captured digital image may be stored in a data storage device of the vehicle controller 60, or the captured digital image may be automatically uploaded to the server 24 of the vehicle website provider 10.

In the event that the captured digital image is stored in the vehicle controller 60, an upload button 138 allows the remote user to upload the captured digital image from the vehicle controller 60 to the storage device 32 in the server 24 of the vehicle website provider 10. Subsequently, the remote user accesses a picture database within the vehicle website or a file transfer protocol (FTP) server to download individual pictures to the remote controller 40. A remote user may wish to capture a digital image of an occupant or object inside of the vehicle 14 or an interesting location outside of the vehicle 14. For example, the remote user may wish to capture a digital image of a suspicious person that is outside of the vehicle 14 in the event that the person vandalizes the vehicle 14. In that case, the digital image may be used by law enforcement personnel to apprehend the criminal.

The vehicle camera 66 may also be programmed to automatically capture digital images when the vehicle 14 is impacted. For example, when the vehicle 14 is struck by another vehicle, the vehicle camera 66 may be programmed to automatically capture digital images while the vehicle camera 66 rotates. The vehicle camera 66 may capture digital images from different angles, for example every 10 degrees, as the vehicle camera 66 rotates. This allows a vehicle owner to verify the identity of a vehicle or driver that strikes the vehicle 14 in the event that the other vehicle leaves the scene of the accident.

A public address button 140 allows the remote user to communicate with entities that are located outside of the vehicle 14. The remote user operates the public address device 76 by activating the public address button 140. This activates a microphone and/or a loudspeaker that are located on an exterior of the vehicle 14. For example, the remote user may wish to communicate with a person outside of the vehicle 14 or warn a potential vandal that the vehicle 14 is being monitored.

An information button 142 allows the remote user to view vehicle information in the vehicle information window 112. For example, the information button 142 may allow the remote user to select from different categories of information. The vehicle information may include vehicle speed, engine temperature, fuel level and other information about the vehicle 14. The remote user displays the vehicle information by activating the information button 142.

In the event that the vehicle 14 includes a global positioning device, a locate button 144 allows the remote user to identify the exact current location of the vehicle 14. The remote user displays the current location of the vehicle 14 by activating the locate button 144. The location of the vehicle 14 may appear in the video feed window 110, the vehicle information window 112, or another window. For example, the vehicle position may be displayed on an interactive map of a surrounding city.

This feature allows the remote user to identify the location of the vehicle 14 at all times. For example, the remote user may identify the location of the vehicle 14 if the vehicle 14 is stolen. Additionally, the video feed window 110 and/or the vehicle information window 112 may be enlarged or maximized to increase the size of an image or the amount of information that is shown in a window. A logoff button 146 allows the remote user to log off of the vehicle website. The remote user exits the vehicle website by activating the logoff button 146.

The command page 106 may be part of a dedicated software package that is developed by a vehicle website provider, and the software may run independently of an Internet web browser. Also, the buttons and/or windows that are shown in FIG. 6 are illustrative and a vehicle website according to the present invention may include different or additional options and/or configurations. For example, a zoom feature for the vehicle camera 66 and/or a video stream capture option that allows the remote user to capture a video stream from the vehicle camera 66 are contemplated. Additionally, a remote user may control devices in the vehicle 14 through a text-based menu.

Figure 7:
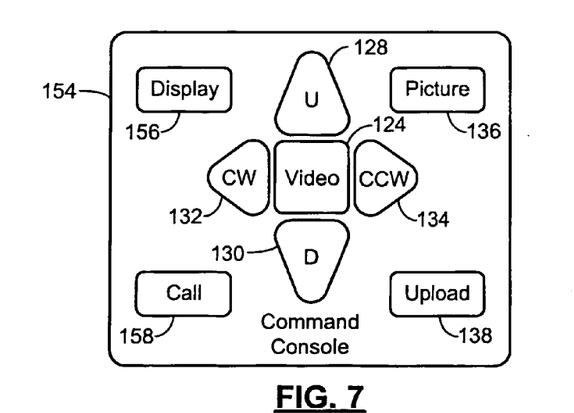
FIG. 7 illustrates an exemplary command console for the vehicle.

Referring now to FIG. 7, the vehicle 14 includes a vehicle command console 154 to operate devices in the vehicle 14 and/or to communicate with the remote user. Similarly to the remote command console 108 of the vehicle website, an vehicle occupant controls features of the vehicle 14 by activating buttons. The buttons of the vehicle command console 154 may be solid buttons that can be actuated or the buttons may be illustrated on a touch-screen or display within the vehicle 14. The vehicle command console 154 includes the video button 124, the upward tilt button 128, the downward tilt button 130, the clockwise rotate button 132, and the counterclockwise rotate button 134, which are identical to the buttons on the remote command console 108.

A display button 156 allows the vehicle occupant to selectively activate or deactivate the vehicle display 74. The vehicle display 74 may be a video screen inside of the vehicle 14 or a projection onto a windshield of the vehicle 14. The vehicle display 74 allows the vehicle occupant to view the current position of the vehicle camera 66 and/or the remote user that is communicating with the vehicle 14. In an exemplary embodiment, the vehicle display 74 may only be activated during specified times. For example, to avoid driver distraction, the vehicle display 74 may only be activated while the engine 64 is deactivated or when the vehicle 14 is in a parked gear.

The picture button 136 allows the vehicle occupant to capture digital images from the vehicle camera 66 similarly to the remote user on the vehicle website. For example, the vehicle occupant may wish to capture a picture of a person or a license plate of another vehicle. It is conceivable that the vehicle controller 60 will have limited storage space for digital images. Therefore, the upload button 138 allows the vehicle occupant as well as the remote user to upload digital images from the vehicle controller 60 to the storage device 32 in the server 24 of the vehicle website provider 10.

The vehicle command console 154 also includes a call button 158. The call button 158 allows the vehicle occupant to initiate communications with the vehicle website. The vehicle occupant initiates the call by activating the call button 158. The remote user may only be able to access any or all of the devices in the vehicle 14 when the vehicle occupant initiates a call to the vehicle website as consent. For example, for privacy concerns, the vehicle occupant may not wish to be viewed or listened to by a remote user without permission. Therefore, privacy settings that relate to remote user access permissions are preferably available on the vehicle website.

A vehicle owner may allow law enforcement personnel to log onto the vehicle website. For example, the vehicle owner may wish to allow law enforcement personnel to view an automobile accident scene or a specific location if the vehicle owner witnesses a crime. In this case, the vehicle owner may provide the law enforcement personnel with an account password and change the password later to prevent unauthorized access.

The vehicle website interface system of the present invention allows a remote user to operate devices inside of a vehicle from remote locations. The system provides increased communications options between remote users and occupants of vehicles and adds security benefits to individuals that wish to ensure a condition and status of a vehicle that is parked or being operated. The present invention may be integrated with existing vehicle systems and/or components to reduce costs. The present invention may also be implemented into existing packages offered by wireless service providers for vehicles.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A website interface system for a vehicle, comprising:
a vehicle that includes a first camera;
a remote device that includes a first display and a first microphone; and
a vehicle website provider that communicates with said vehicle and said remote device and that establishes a communications interface between said vehicle and said remote device, wherein said remote device controls a position of said first camera through said communications interface and said first display displays an image from said first camera and wherein a user of said remote device uses said first microphone to communicate with an occupant of said vehicle.

2. The website interface system of claim 1 wherein said remote device controls an engine of said vehicle through said communications interface.

3. The website interface system of claim 2 wherein said remote device one of activates and deactivates said engine.

4. The website interface system of claim 1 wherein said remote device controls a door of said vehicle through said communications interface.

5. The website interface system of claim 4 wherein said remote devices one of locks and unlocks said door.

6. The website interface system of claim 1 wherein said vehicle includes a second microphone and wherein said occupant uses said second microphone to communicate with said user.

7. The website interface system of claim 1 wherein said vehicle includes a second display and said remote device includes a second camera and wherein said second display displays an image from said second camera.

8. The website interface system of claim 7 wherein said second display is only activated when an engine of said vehicle is deactivated.

9. The website interface system of claim 1 wherein said remote device controls a loudspeaker that is located on an exterior of said vehicle through said communications interface.

10. The website interface system of claim 9 wherein said user uses said first microphone to communicate with entities that are located exterior to said vehicle through said loudspeaker.

11. The website interface system of claim 10 wherein said vehicle includes a second microphone that is located on said exterior and wherein said user and said entities use said first and second microphones, respectively, to communicate.

12. The website interface system of claim 1 wherein said vehicle includes a controller that stores an image from said first camera.

13. The website interface system of claim 12 wherein said controller automatically captures at least one image from said first camera when said vehicle is impacted.

14. The website interface system of claim 13 wherein a position of said first camera automatically adjusts as said controller automatically captures at least two images from said first camera.

15. The website interface system of claim 12 wherein said vehicle website provider includes a data storage device and wherein said user uploads said image to said data storage device.

16. The website interface system of claim 1 wherein said vehicle website provider receives vehicle parameters from said vehicle and displays said vehicle parameters on said first display.

17. The website interface system of claim 16 wherein said vehicle website provider receives global positioning information from said vehicle and displays a location of said vehicle on said first display.

18. The website interface system of claim 1 wherein said remote device communicates with said vehicle website provider through one of a private connection and an Internet protocol address.

19. The website interface system of claim 18 wherein said vehicle website provider receives global positioning information from said vehicle and displays a location of said vehicle on said first display.

20. The website interface system of claim 1 wherein said remote device is one of a personal computer, a mobile telephone, and a personal digital assistant device.

21. A website interface system for a vehicle, comprising:
a vehicle that includes a first camera and that includes a loudspeaker that is located on an exterior of said vehicle;
a remote device that includes a first display and a first microphone; and
a vehicle website provider that communicates with said vehicle and said remote device and that establishes a communications interface between said vehicle and said remote device, wherein said remote device controls said loudspeaker and a position of said first camera through said communications interface, said first display displays an image from said first camera, and a user of said remote device uses said first microphone to communicate with entities that are exterior to said vehicle through said loudspeaker.

22. The website interface system of claim 21 wherein said remote device controls an engine of said vehicle through said communications interface.

23. The website interface system of claim 22 wherein said remote device one of activates and deactivates said engine.

24. The website interface system of claim 21 wherein said remote device controls a door of said vehicle through said communications interface.

25. The website interface system of claim 24 wherein said remote devices one of locks and unlocks said door.

26. The website interface system of claim 21 wherein said remote device controls a position of said first camera.

27. The website interface system of claim 21 wherein said user uses said first microphone to communicate with an occupant of said vehicle.

28. The website interface system of claim 21 wherein said vehicle includes a second microphone and wherein an occupant of said vehicle uses said second microphone to communicate with said user.

29. The website interface system of claim 21 wherein said vehicle includes a second display and said remote device includes a second camera and wherein said second display displays an image from said second camera.

30. The website interface system of claim 29 wherein said second display is only activated when an engine of said vehicle is deactivated.

31. The website interface system of claim 21 wherein said vehicle includes a second microphone on said exterior and wherein said user and said entities use said first and second microphones, respectively, to communicate.

32. The website interface system of claim 21 wherein said vehicle includes a controller that stores an image from said first camera.

33. The website interface system of claim 32 wherein said controller automatically captures at least one image from said first camera when said vehicle is impacted.

34. The website interface system of claim 33 wherein a position of said first camera automatically adjusts as said controller automatically captures at least two images from said first camera.

35. The website interface system of claim 32 wherein said vehicle website provider includes a data storage device and wherein said user uploads said image to said data storage device.

36. The website interface system of claim 21 wherein said vehicle website provider receives vehicle parameters from said vehicle and displays said vehicle parameters on said first display.

37. The website interface system of claim 21 wherein said remote device communicates with said vehicle website provider through one of a private connection and an Internet protocol address.

38. The website interface system of claim 21 wherein said remote device is one of a personal computer, a mobile telephone, and a personal digital assistant device.

* * * * *